(12) United States Patent
Piramuthu et al.

(10) Patent No.: US 11,200,611 B2
(45) Date of Patent: Dec. 14, 2021

(54) COMPUTER VISION FOR UNSUCCESSFUL QUERIES AND ITERATIVE SEARCH

(71) Applicant: eBay Inc., San Jose, CA (US)

(72) Inventors: Robinson Piramuthu, Oakland, CA (US); Timothy Samuel Keefer, San Jose, CA (US); Ashmeet Singh Rekhi, Campbell, CA (US); Padmapriya Gudipati, San Jose, CA (US); Mohammadhadi Kiapour, San Francisco, CA (US); Shuai Zheng, Berkeley, CA (US); Alberto Ordonez Pereira, Santa Clara, CA (US); Ravindra Surya Lanka, San Jose, CA (US); Md Atiq ul Islam, San Jose, CA (US); Nicholas Anthony Whyte, San Jose, CA (US); Giridharan Iyengar, San Jose, CA (US); Bryan Allen Plummer, Urbana, IL (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/235,290

(22) Filed: Dec. 28, 2018

(65) Prior Publication Data

US 2019/0205333 A1    Jul. 4, 2019

Related U.S. Application Data

(60) Provisional application No. 62/612,275, filed on Dec. 29, 2017.

(51) Int. Cl.
*G06F 17/00* (2019.01)
*G06F 7/00* (2006.01)
(Continued)

(52) U.S. Cl.
CPC ......... *G06Q 30/0627* (2013.01); *G06F 3/017* (2013.01); *G06F 16/532* (2019.01);
(Continued)

(58) Field of Classification Search
CPC .. G06F 16/532; G06F 16/538; G06F 16/9535; G06F 3/0482; G06K 9/66
(Continued)

(56) References Cited

U.S. PATENT DOCUMENTS 7,089,226 B1 * 8/2006 Dumais ................... G06F 16/35
707/740
7,801,885 B1 * 9/2010 Verma ................. G06F 16/9535
707/713
(Continued)

FOREIGN PATENT DOCUMENTS

AU    2014274171 A1    1/2016
EP    3155577    4/2017
(Continued)

OTHER PUBLICATIONS

Restriction Requirement Received for U.S. Appl. No. 16/235,140, dated Feb. 26, 2019, 5 pages.
(Continued)

*Primary Examiner* — Pavan Mamillapalli
(74) *Attorney, Agent, or Firm* — FIG. 1 Patents

(57) ABSTRACT

Computer vision for unsuccessful queries and iterative search is described. The described system leverages visual search techniques by determining visual characteristics of objects depicted in images and describing them, e.g., using feature vectors. In some aspects, these visual characteristics are determined for search queries that are identified as not being successful. Aggregated information describing visual characteristics of images of unsuccessful search queries is used to determine common visual characteristics and objects
(Continued)

depicted in those images. This information can be used to inform other users about unmet needs of searching users. In some aspects, these visual characteristics are used in connection with iterative image searches where users select an initial query image and then the search results are iteratively refined. Unlike conventional techniques, the described system iteratively refines the returned search results using an embedding space learned from binary attribute labels describing images.

20 Claims, 7 Drawing Sheets

(51) Int. Cl.
| | |
|---|---|
| *G06Q 30/06* | (2012.01) |
| *G06F 16/538* | (2019.01) |
| *G06F 16/9535* | (2019.01) |
| *G06F 16/532* | (2019.01) |
| *G06K 9/66* | (2006.01) |
| *G06F 16/583* | (2019.01) |
| *G06N 20/00* | (2019.01) |
| *G06F 3/01* | (2006.01) |
| *G06K 9/00* | (2006.01) |
| *G06K 9/62* | (2006.01) |
| *G06F 3/0482* | (2013.01) |
| *G06F 3/0484* | (2013.01) |
| *G06F 3/0488* | (2013.01) |

(52) U.S. Cl.
CPC .......... *G06F 16/538* (2019.01); *G06F 16/583* (2019.01); *G06F 16/9535* (2019.01); *G06K 9/00671* (2013.01); *G06K 9/6202* (2013.01); *G06K 9/66* (2013.01); *G06N 20/00* (2019.01); *G06Q 30/0643* (2013.01); *G06F 3/0482* (2013.01); *G06F 3/0488* (2013.01); *G06F 3/04842* (2013.01); *G06Q 30/0621* (2013.01); *G06Q 30/0631* (2013.01)

(58) Field of Classification Search
USPC ........................................................ 707/722
See application file for complete search history.

(56) References Cited

U.S. PATENT DOCUMENTS

| | | | | |
|---|---|---|---|---|
| 7,835,953 | B2* | 11/2010 | Chen | G08G 1/20 |
| | | | | 705/28 |
| 7,907,755 | B1* | 3/2011 | Perlmutter | G06K 9/00288 |
| | | | | 382/118 |
| 8,374,920 | B2 | 2/2013 | Hedges et al. | |
| 8,386,486 | B2 | 2/2013 | Zhang et al. | |
| 8,478,744 | B1* | 7/2013 | Rose | G06Q 20/108 |
| | | | | 707/721 |
| 8,589,410 | B2* | 11/2013 | Sud | G06F 16/951 |
| | | | | 707/748 |
| 8,630,851 | B1* | 1/2014 | Hertschuh | G10L 15/26 |
| | | | | 704/235 |
| 8,832,096 | B1 | 9/2014 | Jing et al. | |
| 8,908,962 | B2 | 12/2014 | Bhardwaj et al. | |
| 9,015,139 | B2* | 4/2015 | Wong | G06F 16/78 |
| | | | | 707/706 |
| 9,158,389 | B1 | 10/2015 | Sharma et al. | |
| 9,171,092 | B2 | 10/2015 | Kruglick | |
| 9,176,993 | B2 | 11/2015 | Grauman et al. | |
| 9,269,011 | B1 | 2/2016 | Sikka et al. | |
| 9,317,753 | B2 | 4/2016 | Saptharishi et al. | |
| 9,420,319 | B1 | 8/2016 | Story, Jr. et al. | |
| 9,639,957 | B2 | 5/2017 | Yalniz et al. | |
| 9,672,436 | B1 | 6/2017 | Dhua | |
| 10,109,051 | B1* | 10/2018 | Natesh | G06K 9/4652 |
| 10,380,734 | B2 | 8/2019 | Parikh et al. | |
| 10,963,940 | B2 | 3/2021 | Piramuthu et al. | |
| 2002/0019819 | A1* | 2/2002 | Sekiguchi | G06F 16/5838 |
| 2004/0243545 | A1* | 12/2004 | Boone | G16Z 99/00 |
| 2005/0065773 | A1* | 3/2005 | Huang | G06F 17/2735 |
| | | | | 704/7 |
| 2005/0086223 | A1 | 4/2005 | Rui | |
| 2007/0067279 | A1* | 3/2007 | Bonabeau | G06N 3/126 |
| | | | | 707/999.004 |
| 2007/0266002 | A1* | 11/2007 | Chowdhury | G06F 16/3326 |
| 2008/0152231 | A1* | 6/2008 | Gokturk | G06Q 30/08 |
| | | | | 382/209 |
| 2008/0154856 | A1* | 6/2008 | Riise | G06F 16/3338 |
| 2008/0177640 | A1* | 7/2008 | Gokturk | G06Q 30/0603 |
| | | | | 705/26.62 |
| 2009/0041340 | A1* | 2/2009 | Suzuki | G06K 9/00288 |
| | | | | 382/159 |
| 2009/0074300 | A1* | 3/2009 | Hull | G06K 9/00463 |
| | | | | 382/209 |
| 2009/0089246 | A1* | 4/2009 | Chi | G06F 16/951 |
| 2009/0132388 | A1* | 5/2009 | Omori | G06F 16/26 |
| | | | | 705/26.1 |
| 2009/0282025 | A1 | 11/2009 | Winter et al. | |
| 2010/0241528 | A1 | 9/2010 | Hedges et al. | |
| 2011/0219025 | A1 | 9/2011 | Lipson et al. | |
| 2012/0062732 | A1 | 3/2012 | Marman et al. | |
| 2012/0095866 | A1 | 4/2012 | Caiazzi et al. | |
| 2012/0127316 | A1 | 5/2012 | Kundu et al. | |
| 2013/0121600 | A1* | 5/2013 | Lin | G06K 9/4676 |
| | | | | 382/224 |
| 2013/0249934 | A1 | 9/2013 | Gershon et al. | |
| 2013/0293580 | A1 | 11/2013 | Spivack | |
| 2014/0040279 | A1* | 2/2014 | Beygelzimer | G06F 16/00 |
| | | | | 707/748 |
| 2014/0101134 | A1* | 4/2014 | Bohrer | G06Q 30/02 |
| | | | | 707/722 |
| 2014/0258267 | A1* | 9/2014 | Lin | G06F 16/5866 |
| | | | | 707/722 |
| 2014/0324836 | A1 | 10/2014 | Chittar et al. | |
| 2015/0081656 | A1* | 3/2015 | Wang | G06F 16/90324 |
| | | | | 707/706 |
| 2015/0248719 | A1 | 9/2015 | Hansen | |
| 2015/0293942 | A1 | 10/2015 | Cady et al. | |
| 2016/0109941 | A1 | 4/2016 | Govindarajeswaran et al. | |
| 2016/0171773 | A1 | 6/2016 | Hara | |
| 2016/0234568 | A1 | 8/2016 | Grusd | |
| 2016/0292757 | A1 | 10/2016 | Bandara et al. | |
| 2016/0320932 | A1 | 11/2016 | Belhumeur et al. | |
| 2016/0321733 | A1 | 11/2016 | Yonaha et al. | |
| 2016/0364414 | A1 | 12/2016 | Petrou et al. | |
| 2016/0378861 | A1 | 12/2016 | Eledath et al. | |
| 2017/0097948 | A1* | 4/2017 | Kerr | G06N 3/08 |
| 2017/0124434 | A1 | 5/2017 | Goodwin et al. | |
| 2017/0186032 | A1 | 6/2017 | Rangasamy kannadasan et al. | |
| 2017/0206465 | A1 | 7/2017 | Jin et al. | |
| 2017/0243275 | A1 | 8/2017 | Goens et al. | |
| 2017/0300905 | A1 | 10/2017 | Withrow et al. | |
| 2018/0089542 | A1 | 3/2018 | Stoop et al. | |
| 2018/0260843 | A1 | 9/2018 | Hiranandani et al. | |
| 2018/0276731 | A1 | 9/2018 | Patel et al. | |
| 2018/0284955 | A1 | 10/2018 | Canavor et al. | |
| 2018/0336009 | A1 | 11/2018 | Yoganandan et al. | |
| 2019/0102752 | A1 | 4/2019 | Valenti et al. | |
| 2019/0197599 | A1 | 6/2019 | Zia et al. | |
| 2019/0205646 | A1 | 7/2019 | Piramuthu et al. | |
| 2019/0205962 | A1 | 7/2019 | Piramuthu et al. | |
| 2019/0206130 | A1 | 7/2019 | Ericson et al. | |
| 2019/0244271 | A1 | 8/2019 | Piramuthu et al. | |
| 2019/0244436 | A1 | 8/2019 | Stansell et al. | |
| 2021/0201378 | A1 | 7/2021 | Piramuthu et al. | |

FOREIGN PATENT DOCUMENTS

| | | |
|---|---|---|
| WO | WO-2015191461 | 12/2015 |
| WO | 2019/133849 A1 | 7/2019 |
| WO | 2019/133862 A1 | 7/2019 |

(56) References Cited

FOREIGN PATENT DOCUMENTS

WO      2019/133891 A1      7/2019
WO      2019/133849 A8      7/2020

OTHER PUBLICATIONS

"What is Bing Visual Search API" Retrieved at: https://docs.microsoft.com/en-us/azure/cognitive-services/bing-visual-search/overview, Mar. 12, 2018, 129 pages.
Response to Restriction Requirement filed on May 2, 2019 for U.S. Appl. No. 16/235,007, dated Apr. 17, 2019, 8 pages.
Restriction Requirement received for U.S. Appl. No. 16/235,007 dated Apr. 17, 2019, 7 pages.
Non-Final Office Action received for U.S. Appl. No. 16/235,140, dated May 10, 2019, 21 pages.
Response to Restriction Requirement filed on Apr. 18, 2019 for U.S. Appl. No. 16/235,140 , dated Feb. 26, 2019, 7 pages.
Brunelli, et al., "Image Retrieval by Examples", IEEE Transactions on Multimedia, vol. 2, No. 3, Sep. 10, 2000, pp. 164-171.
Funk, "Searching the Real World Using Stationary and Mobile Object Detection", Retrieved from the Internet: URL: http://makufunk.dejdownloadjfunk -antonius final.pdf—[retrieved on Mar. 22, 2019], Dec. 20, 2012, pp. 1-86.
Hsiao- Ti Eh Pu, "An Analysis of Web Image Queries for Search", Oct. 22, 2003, pp. 340-348.
Kovashka, et al., "Attribute Pivots for Guiding Relevance Feedback in Image Search", Dec. 1, 2013, 8 pages.
International Search Report received for PCT Application No. PCT/US2018/067925, dated Apr. 2, 2019, 5 pages.
International Written Opinion received for PCT Application No. PCT/US2018/067925, dated Apr. 2, 2019, 9 pages.
International Search Report received for PCT Application No. PCT/US2018/067945, dated Apr. 1, 2019, 5 pages.
International Written Opinion received for PCT Application No. PCT/US2018/067945, dated Apr. 1, 2019, 11 pages.
International Search Report received for PCT Application No. PCT/US2018/067982, dated May 13, 2019, 7 pages.
International Written Opinion received for PCT Application No. PCT/US2018/067982, dated May 13, 2019, 7 pages.
Invitation To Pay Additional Fees received for PCT Application No. PCT/US2018/067982, dated Mar. 19, 2019, 11 pages.
Tang, et al., "IntentSearch: Capturing User Intention for One-Click Internet Image Search", Retrieved from the Internet: URL:http://citeseerx.ist.psu.edu/viewdoc/download?doi=10.1.1.407.9573&rep=rep1&type= pdf [retrieved on Mar. 21, 2019], Jul. 1, 2012, pp. 1342-1353.
Non-Final Office Action received for U.S. Appl. No. 16/235,007, dated Jun. 13, 2019, 9 pages.
Response to Non-Final Office Action filed on Aug. 29, 2019, for U.S. Appl. No. 16/235,007, dated Jun. 13, 2019, 14 Pages.
Applicant Initiated Interview Summary Received For U.S. Appl. No. 16/235,140, dated Jun. 24, 2019, 3 pages.
Response to Final Office Action filed dated Aug. 5, 2019 for U.S. Appl. No. 16/235,140, dated May 10, 2019, 13 pages.
"Examiner Interview Summary", U.S. Appl. No. 16/235,007, dated Apr. 27, 2020, 3 pages.
"Examiner Interview Summary", U.S. Appl. No. 16/235,140, dated Apr. 15, 2020, 3 pages.
"Response to Final Office Action", U.S. Appl. No. 16/235,007, dated Jan. 28, 2020, 13 pages.
"Response to Non-Final Office Action", U.S. Appl. No. 16/235,007, dated Apr. 24, 2020, 16 pages.
Kovashka et al., "WhittleSearch: Interactive Image Search with Relative Attribute Feedback", International Journal of Computer Vision, vol. 115, Apr. 4, 2015, pp. 185-210.
Zhao et al., "Memory-Augmented Attribute Manipulation Networks for Interactive Fashion Search", Retrieved from the Internet <http://zpascal.net/cvpr2017/Zhao_Memory-Augmented_Attribute_Manipulation_CVPR_2017_paper.pdf> , 2017, 9 pages.
Final Office Action Received for U.S. Appl. No. 16/235,140 , dated Oct. 18, 2019, 18 pages.
Final Office Action Received for U.S. Appl. No. 16/235,007, dated Nov. 27, 2019, 12 pages.
Applicant Initiated Interview Summary Received for U.S. Appl. No. 16/235,140, dated Dec. 9, 2019, 3 pages.
Response to Final Office Action filed on Dec. 19, 2019 for U.S. Appl. No. 16/235,140, dated Oct. 18, 2019, 12 pages.
"Examiner Interview Summary", U.S. Appl. No. 16/235,140, dated Dec. 9, 2019, 3 pages.
"Non-Final Office Action", U.S. Appl. No. 16/235,007, dated Feb. 7, 2020, 11 pages.
"Non-Final Office Action", U.S. Appl. No. 16/235,140, dated Jan. 24, 2020, 28 pages.
"Relative Attribute Comparisons for Interactive Image Search from Binary Attribute Labels", Anonymous AAAI submission, Paper ID: 905, 2018, 8 pages.
Branson,"Visual Recognition with Humans in the Loop", ECCV 2010. Lecture Notes in Computer Science, vol. 6314, Sep. 2010, 14 pages.
Final Office Action received for U.S. Appl. No. 16/235,140, dated Jul. 23, 2020, 32 Pages.
International Preliminary Report on Patentability received for PCT Application No. PCT/US2018/067925, dated Jul. 9, 2020, 11 pages.
International Preliminary Report on Patentability received for PCT Application No. PCT/US2018/067945, dated Jul. 9, 2020, 13 pages.
International Preliminary Report on Patentability received for PCT Application No. PCT/US2018/067982, dated Jul. 9, 2020, 9 Pages.
Appeal Brief filed on Jul. 6, 2020, for U.S. Appl. No. 16/235,007, 25 pages.
Decision on Pre-Appeal Brief Request for U.S. Appl. No. 16/235,007, dated May 21, 2020, 2 pages.
Pre-Appeal Brief filed for U.S. Appl. No. 16/235,007, dated May 6, 2020, 7 pages.
Corrected Notice of Allowability received for U.S. Appl. No. 16/235,007, dated Dec. 11, 2020, 13 pages.
Corrected Notice of Allowability received for U.S. Appl. No. 16/235,007, dated Dec. 28, 2020, 13 pages.
Corrected Notice of Allowability Received for U.S. Appl. No. 16/235,007, dated Feb. 26, 2021, 14 pages.
Notice of Allowance received for U.S. Appl. No. 16/235,007, dated Nov. 3, 2020, 18 pages.
PTO Response to Rule 312 Communication received for U.S. Appl. No. 16/235,007, dated Nov. 23, 2020, 2 pages.
Notice of Allowance received for U.S. Appl. No. 16/235,007, dated Sep. 16, 2020, 18 pages.
Non-Final Office Action received for U.S. Appl. No. 16/235,140, dated Oct. 16, 2020, 36 Pages.
Response to Final Office Action filed on Sep. 16, 2020 for U.S. Appl. No. 16/235,140, dated Jul. 23, 2020, 16 pages.
Non-Final Office Action received for U.S. Appl. No. 16/388,473, dated Sep. 15, 2020, 22 Pages.
Final Office Action Received for U.S. Appl. No. 16/235,140, dated Apr. 19, 2021, 36 Pages.
Final Office Action received for U.S. Appl. No. 16/388,473, dated Mar. 10, 2021, 25 pages.
Non Final Office Action Received for U.S. Appl. No. 16/388,473, dated May 6, 2021, 25 pages.
Miller Am. , "Valuing Watches, Coin Jewelry, Carvings, and other Articles. In: Gems and Jewelry Appraising", Springer, Boston, MA. https://doi.org/10.1007/978-1-4684-1404-2_6, 1988, 2 pages.
Examiner's Answer to Appeal Brief received for U.S. Appl. No. 16/235,140, dated Oct. 26, 2021, 11 Pages.
Corrected Notice of Allowability Received for U.S. Appl. No. 16/388,473, dated Oct. 21, 2021, 3 Pages.
Notice of Allowance Received for U.S. Appl. No. 16/388,473, dated Sep. 14, 2021, 10 Pages.

\* cited by examiner

600

610

COMPUTER VISION FOR UNSUCCESSFUL QUERIES AND ITERATIVE SEARCH

RELATED APPLICATION

This application claims priority under 35 U.S.C. § 119(e) to U.S. Provisional Patent Application No. 62/612,275, filed Dec. 29, 2017, and titled "Computer Vision," the entire disclosure of which is hereby incorporated by reference.

BACKGROUND

Conventional text-based search systems depend on a user's ability to express a goal of a search using text. Thus, although these systems may function well in instances in which a goal is readily expressible using text (e.g., find "red running shoes"), these systems may fail in instances in which it is difficult to express this goal using text. This problem is further exacerbated by a requirement in these conventional systems that a common understanding is reached between how items in a search result are identified and techniques used to express the goal, for instance, that both a seller listing an item and prospective buyer searching for the item agree that the item is described with text as "red running shoes." Due to this, conventional systems may not provide search results that suitably match concepts that users have in mind when initiating searches with these conventional systems.

SUMMARY

To overcome these problems, computer vision for unsuccessful queries and iterative search is leveraged in a digital medium environment. Rather than searching for images by comparing text queries to text data of images, the system described herein leverages visual search techniques where the system determines visual characteristics of objects depicted in images and compares the determined characteristics to visual characteristics of other images, e.g., to identify whether the other images have similar visual characteristics.

In some aspects, these visual characteristics are determined for search queries that are identified as not being successful, such as because a user enters a different search query, selects to refine the search, and so on. Regardless, the described system aggregates the visual characteristics of the images included in the unsuccessful search queries. Based on this aggregated information, common visual characteristics and objects depicted in the images of unsuccessful search queries are determined. This information can be used to inform other users about unmet needs of searching users.

In some aspects, these visual characteristics are used in connection with iterative image searches where users select an initial query image and then the search results are iteratively refined, e.g., by presenting a plurality of digital images for selection and receiving a user selection of one of the presented images. Based on this, visual characteristics of images selected across the iterations are used to identify a next plurality of images. This process continues until the user indicates satisfaction with one of the presented images or selects to restart the image search. Unlike conventional techniques, though, the described system iteratively refines the returned search results using an embedding space learned from binary attribute labels describing images—not from relative attribute tags describing the images.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
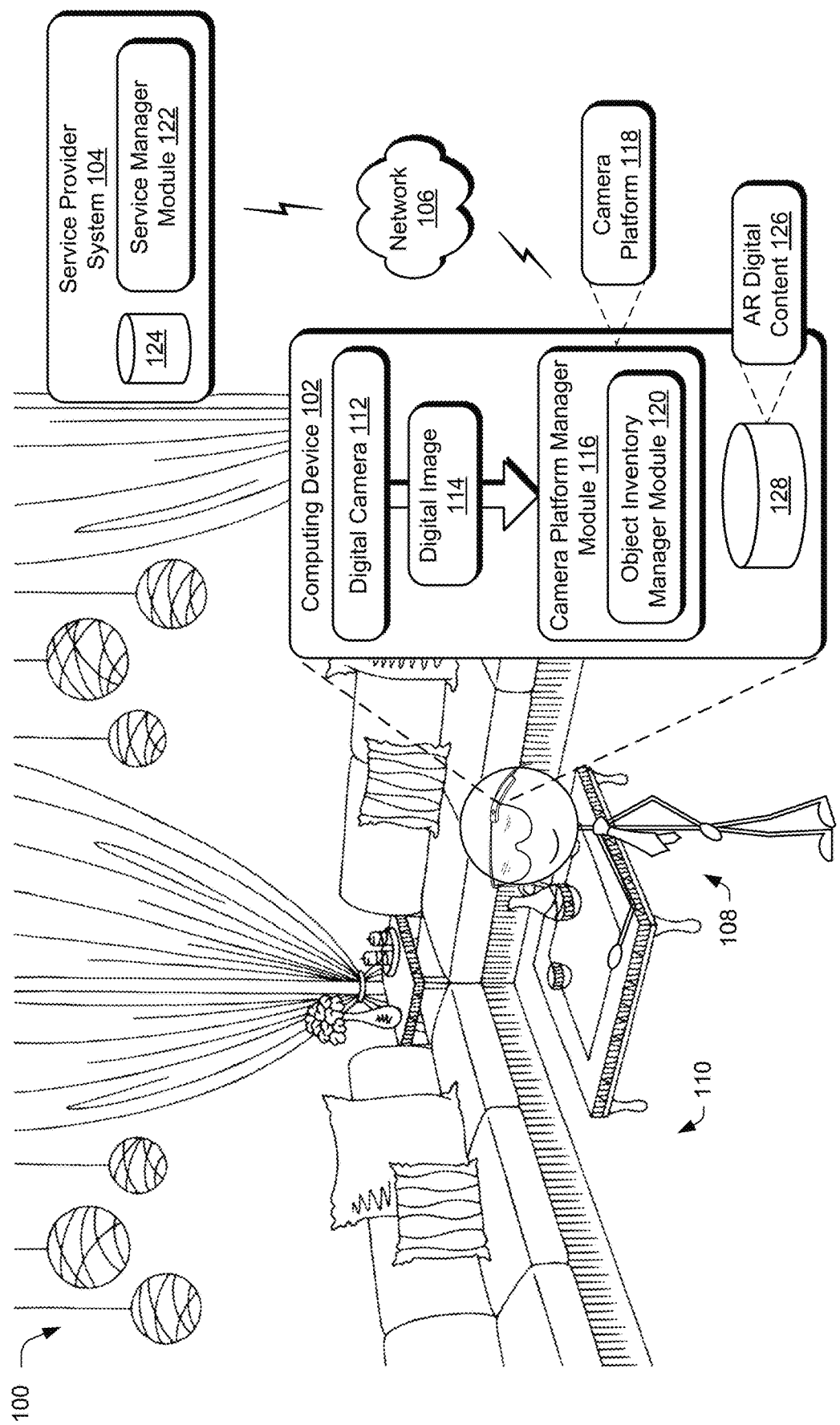
FIG. 1 is an illustration of an environment in an example implementation that is operable to employ techniques described herein.

Conventional text-based search systems depend on a user's ability to express a goal of a search using text. Thus, although these systems may function well in instances in which a goal is readily expressible using text (e.g., find "red running shoes"), these systems may fail in instances in which it is difficult to express this goal using text. This problem is further exacerbated by a requirement in these conventional systems that a common understanding is reached between how items in a search result are identified and techniques used to express the goal.

To overcome these problems, computer vision is leveraged in a digital medium environment in connection with unsuccessful queries and iterative search. Rather than leverage image searches that compare text queries to text data (e.g., metadata) of images, the system described herein leverages visual search techniques where the system determines visual characteristics of objects depicted in images and compares the determined characteristics to visual characteristics of other images, e.g., to identify whether the other images have similar visual characteristics.

In some aspects, the described system provides information about commonalities across unsuccessful visual search queries to users. Generally speaking, a search query that is not successful provides search results that are not satisfactory to a searching user. The described system may identify user dissatisfaction with search results in a variety of ways. For example, if a user enters another search query without selecting any of the returned search results, then the system may identify the initial search query as not successful. Additionally or alternately, if input is received to refine search results—rather than indicating that the search results are satisfactory—then the system may identify the initial search query as not successful. The system may also identify a search query as successful or not successful based on whether any of the corresponding search results resulted in conversion of a product or service.

Regardless of the criteria used to identify unsuccessful search queries, the described system derives data describing recognized objects (and visual characteristics of the recognized objects) in images of the identified unsuccessful search queries. The system then aggregates this data using machine learning to identify objects and visual characteristics that are common to images of unsuccessful search queries. Based on this aggregated data, the system generates results (e.g., a report) describing the common objects and visual characteristics of the images of unsuccessful search queries.

For example, the system can provide this information to entities that list and/or produce products. Consider an example in which client device users perform a multitude of searches for a similar plaid pattern during the winter. The system may generate a report with analytics indicating that users are searching for this plaid, and that only a few search results are returned to the client device users, because there are very few products listed having this or a same pattern. A listing client device user may utilize this information to list more products having this pattern. An entity that produces products may utilize this information to produce more products having this pattern.

In further aspects, the described system uses human in the loop feedback to refine image search results to help users convey a mental picture of their search goal. Generally speaking, the system presents multiple images to a client device user via a user interface and prompts the user to select the image that is most similar to the mental picture the user has in mind as a goal for the search. The system then uses the selected image to further refine the search results.

In contrast to conventional systems that refine image search results using iterative human in the loop feedback, the described system uses an embedding space trained using binary attribute labels. Binary attribute labels indicate the presence of objects and themes in a digital image whereas the absence of a binary attribute label indicates the absence of a respective object or theme in the digital image, as discussed in detail below. By way of comparison, conventional techniques for iterative searches with human in the loop feedback use embedding spaces trained with relative attribute tags. Relative attribute tags are indicative of a relative degree to which an image depicts a particular item, as described in more detail below. Leveraging relative attribute tags, however, may be computationally expensive to further refine image search results. This can lead to a perceptible delay between user selection of an image and providing a new set of images, and also of ultimately presenting an image that most closely aligns with the mental picture of the client device user. The described system does not use relative attribute tags in connection with training an image embedding space to further refine search results. By instead using binary attribute labels to train the embedding space, the described system is able to use the embedding space to identify images for search results in a less computationally expensive manner than techniques that use relative attribute tags. This can lead to shorter delays between the user selection and provision of a new set of images.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the techniques described herein. The illustrated environment 100 includes a computing device 102 that is communicatively coupled to a service provider system 104 via a network 106. Computing devices that implement the computing device 102 and the service provider system 104 may be configured in a variety of ways.

A computing device, for instance, may be configured as a desktop computer, a laptop computer, a mobile device (e.g., assuming a handheld configuration such as a tablet or mobile phone), configured to be worn (e.g., as goggles as depicted in the illustrated environment 100) and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" for the service provider system 104 as described in FIG. 7.

In the illustrated environment 100, the computing device 102 is depicted as being worn by a user 108 in a physical environment, e.g., a living room 110. In this example, the computing device 102 includes a digital camera 112 that is configured to capture digital images 114 of an outside physical environment (e.g., the living room 110), such as through use of a charge coupled device (CCD) sensor. The captured digital images 114 may then be stored as pixels in a computer-readable storage medium and/or rendered for display by a display device, e.g., LCD, OLED, LED, etc.

The computing device 102 also includes a camera platform manager module 116 that is configured to implement and execute a camera platform 118 (e.g., through use of a processing system and computer-readable storage media) that may serve as a basis for a variety of functionality. The camera platform 118, for instance, may implement a "live view" formed of digital images 114 taken of the physical environment of the computing device 102. These digital images 114 may then serve as a basis to support other functionality.

An example of this functionality is illustrated as an object inventory manager module 120. The object inventory manager module 120 is representative of functionality to manage an inventory of objects. This may include objects that are owned by the user 108 and/or objects that are desired by the user 108, e.g., for purchase. This may be implemented by the object inventory manager module 120 through use of the camera platform 118 in a variety of ways.

In a first such example, the object inventory manager module 120 is configured to collect digital images 114. This may include digital images 114 of physical objects in the living room 110 in this example, digital images 114 of other environments (e.g., in a city of a celebrity), or digital images captured of physical photos (e.g., from a magazine, a picture taken of a television screen or other display device), and so on. The digital image 114 may also be captured of a user interface output by the computing device 102, e.g., as a screenshot from a frame buffer.

The object inventory manager module 120 includes object recognition functionality to recognize objects included within the digital image 114, e.g., via machine learning. Based on this recognition, the object inventory manager module 120 may collect data pertaining to these recognized objects. Data describing the recognized objects, for instance, may be communicated via the network 106 to the service provider system 104. The service provider system 104 includes a service manager module 122 that is configured to obtain data related to the objects (e.g., through use of a search) from a storage device 124. The service provider system 104 can then communicate this obtained data back to the computing device 102 via the network 106 for use by the object inventory manager module 120. The service provider system 104 can also make determinations or predictions in relation to this data and communicate data related to these determinations or predictions to the computing device 102 or a different computing device via the network 106. These determinations, for example, may include determinations that numbers of users request searches for objects having similar visual characteristics and that these searches are not returning results that the users find satisfactory.

In a scenario where the obtained data is communicated back to the computing device 102, for instance, the object inventory manager module 120 may generate augmented reality (AR) digital content 126 (illustrated as stored in a storage device 128). In particular, the object inventory manager module 120 may generate this AR digital content 126 for output via a user interface of the computing device 102 as part of a "live feed" of digital images taken of the physical environment, e.g., the living room 110. The AR digital content 126, for instance, may describe characteristics of an object in the living room 110, a brand name of the object, a price for which the object is available for sale or purchase (e.g., via an online auction), and so forth. This AR digital content 126 is then displayed on the user interface for viewing proximal to the object by the object inventory manager module 120. In this way, the camera platform supports functionality for the user 108 to "look around" the living room 110 and view additional object information and insight into characteristics of objects included within the physical environment. In scenarios where the computing device 102 is configured as a mobile device (e.g., a mobile phone), a user may move the mobile device around the environment to view supplemental information provided by the AR digital content 126.

Having considered an example environment, consider now a discussion of some example details of the techniques of computer vision for unsuccessful queries and iterative search in in accordance with one or more implementations.

Computer Vision for Unsuccessful Queries and Iterative Search

Figure 2:
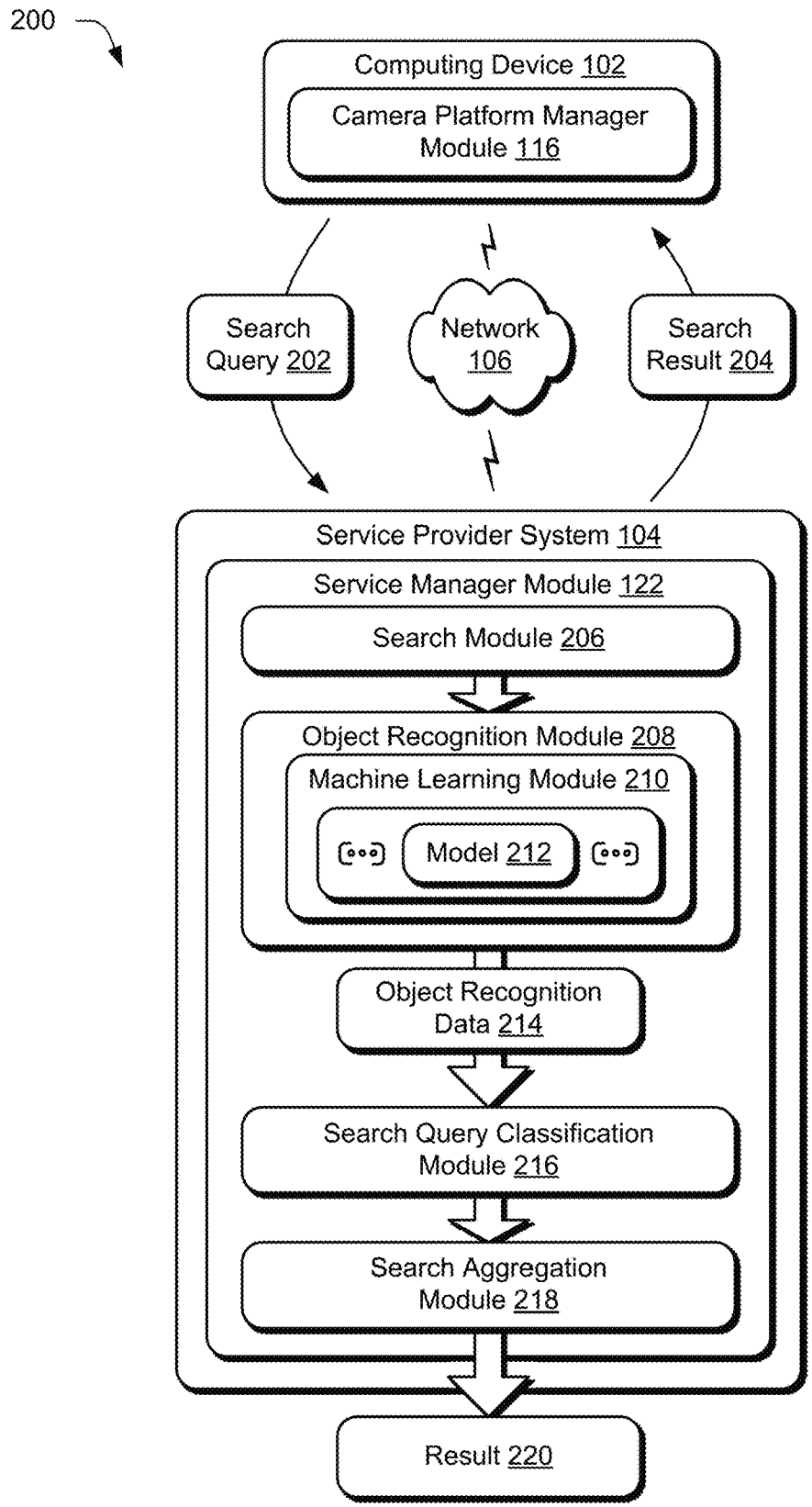
FIG. 2 depicts an example system in which operation of the camera platform manager module and the service manager module of FIG. 1 is depicted in greater detail.
Figure 3:
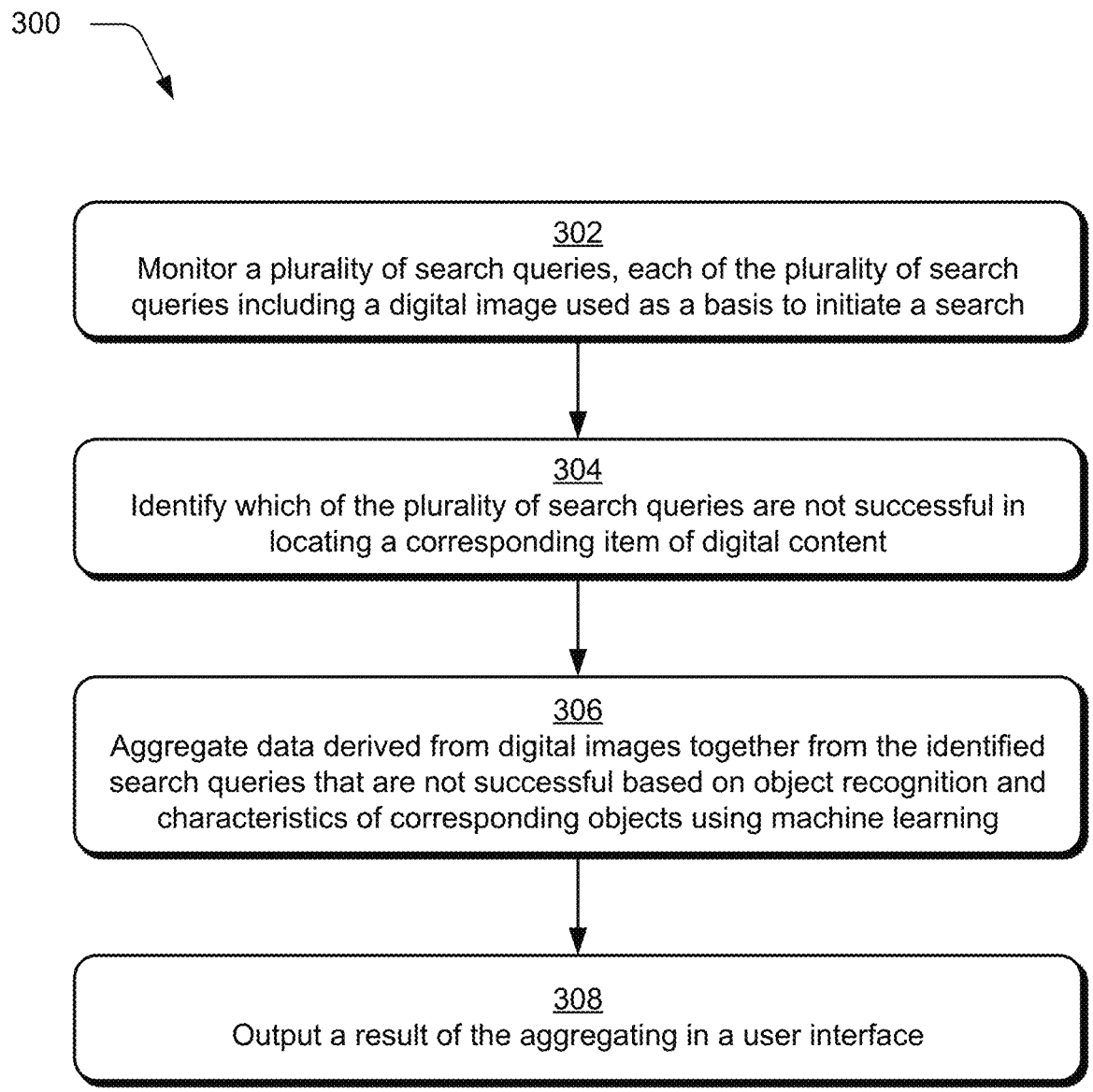
FIG. 3 depicts a procedure in an example implementation in which data obtained from digital images involved in unsuccessful search queries is surfaced to expose unmet needs of users.

In some aspects, computer vision is leveraged in connection with surfacing data obtained from digital images involved with unsuccessful search queries, which is discussed in relation to FIGS. 2 and 3. Aspects of computer vision and image characteristic search also include leveraging iterative search without using relative attribute tags, which is discussed in relation to FIGS. 4-6.

Unsuccessful Search Queries

FIG. 2 depicts a system 200 in an example implementation showing operation of the camera platform manager module 116 and the service manager module 122 of FIG. 1 in greater detail. FIG. 3 depicts a procedure 300 in an example implementation in which data obtained from digital images that are involved in unsuccessful search queries is surfaced to expose unmet needs of users.

Conventional text based search techniques as implemented by a computing device are dependent on a user's ability to express a goal of a search using text. Thus, although these techniques may function well in instances in which a goal is readily expressible using text (e.g., find "red running shoes"), these techniques may fail in instances in which it is difficult to express this goal using text. This problem is further exacerbated by a requirement in these conventional systems that a common understanding is reached between how items in a search result are identified and techniques used to express the goal, i.e., that both a seller listing and prospective buyer agree that the object pertains to "red running shoes."

Accordingly, image search techniques are described that employ a digital image as part of a search query to locate digital content of interest, e.g., listings of particular products and services. For example, digital images may be used to identify characteristics that otherwise may be difficult to describe, such as patterns, shape of an object (e.g., a collar having this shape, a type of heel on a shoe), and so forth. Thus, these digital images used as part of the search may support an improved technique to specify a user's intent as part of a search of digital content. In the techniques described herein, this ability is leveraged to identify unmet user need by using image searches that were unsuccessful (e.g., did not result in conversion of a product or service) to identify these characteristics that otherwise may be difficult to express.

In the illustrated example 200, the service provider system 104 is depicted receiving search query 202. It is to be appreciated that the search query 202 may correspond to multiple search queries relative to which the service provider system 104 carries out its functionality, such as conducting searches, generating reports about common objects or characteristics of images from unsuccessful search queries, and so on. In accordance with the described techniques, for instance, the service provider system 104 receives a plurality of search queries 202 from a plurality of computing devices. Broadly speaking, the service provider system 104 includes functionality (e.g., the service manager module 122) to process each of these search queries 202 and return a respective search result 204.

Functionality to perform a search requested by a search query 202 is represented by search module 206. The search module 206, for instance, may leverage a plurality of models using machine learning to identify objects and characteristics of the objects in digital images included as part of the search query 202. These digital images may be processed by an object recognition module 208 to recognize one or more objects and characteristics in the digital images. The object recognition module 208, for instance, may employ a machine learning module 210 configured to leverage models 212 usable to recognize objects and visual characteristics (e.g., patterns) using machine learning, e.g., neural networks, convolutional neural networks, deep learning networks, structured vector machines, decision trees, and so forth. The models 212, for instance, may be trained using training digital images that are tagged with corresponding identifications.

In an implementation, these training digital images and tags are obtained from a commerce service provider system and are tagged by sellers using the system. As a result, a multitude of accurately tagged training digital images may be obtained with minimal computation and user cost as opposed to conventional manual tagging techniques. Although illustrated as implemented locally by the service provider system 104, this functionality may also be implemented in whole or in part by the computing device 102 via the network 106.

The illustrated system 200 also includes object recognition data 214, which describes one or more objects or one or more patterns depicted in the digital images of the search queries 202. In accordance with the described techniques, this object recognition data 214 may correspond to text data describing the recognized object or pattern. Additionally or alternately, the object recognition data 214 may correspond to a feature representation (e.g., a feature vector) indicative of visual characteristics of the recognized object. The object recognition data 214 configured as feature representations can also be indicative of visual characteristics (e.g., patterns, shapes, materials, textures, and so forth) of depicted content which may be difficult to describe using mere text. Notably, such visual characteristics may be difficult not only for users to describe with text (e.g., in a text input field or generated based on words spoken to a voice assistant device) but also for computing systems to describe with text in a human-understandable manner.

In the illustrated example 200, the service manager module 122 is also depicted with search query classification module 216. In accordance with the described techniques, the search query classification module 216 represents functionality to identify the search queries 202 that are successful and unsuccessful in locating a corresponding item of digital content. The search query classification module 216 may identify successful and unsuccessful queries based, in part, on user feedback received in relation to the search result 204.

Responsive to user feedback indicating to further refine the search results—because they do not match a concept a user has in mind for a search—the search query classification module 216 may determine that the respective search query 202 is unsuccessful. In implementations, the search query classification module 216 may make this determination for a particular query even when feedback is eventually received indicating that refined search results are suitable, e.g., in connection with a non-first iteration of refining the search results. The search query classification module 216 may make this determination based on a variety of feedback, including whether or not another search query is entered by a user, whether an item of digital content included in the search result 204 is selected by a user (e.g., to cause conversion of a corresponding product or service), and so forth.

In connection with the unsuccessful search queries, the service manager module 122 can leverage functionality of search aggregation module 218. The search aggregation module 218 aggregates data derived from the digital images together that is from the search queries that are not successful. This derived data is derived using machine learning and based on objects recognized and characteristics of the digital images of the unsuccessful queries, such as from the object recognition data 214 corresponding to the unsuccessful queries' images. The search aggregation module 218 is further configured to cause output of a result 220 of the aggregation via a user interface. For instance, the result 220 may be configured as a report about common characteristics of unsuccessful search queries and that is communicated to a device for display. By way of example, the result 220 may include representative digital images used to perform the search, data describing the objects and/or characteristics of the objects, and so forth. This data may thus be used by the service provider system 104 to identify unmet needs that may then be subsequently met by others, e.g., to indicate other products or services to be offered.

For example, the service provider system 104 can provide this information to entities that list and/or produce products. Consider an example in which client device users perform a multitude of searches for a similar plaid pattern during the winter. The service provider system 104 may generate the result 220 as a report with analytics indicating that users are searching for this plaid, and that only a few search results are returned to the client device users, because there are very few products listed having this or a same pattern. A listing client device user may utilize this information to list more products having this pattern. An entity that produces products may utilize this information to produce more products having this pattern.

In this context, consider the example procedure 300 in which image searches that were unsuccessful are leveraged to identify unmet user needs which relate to characteristics that otherwise may be difficult to express.

A plurality of search queries is monitored by a computing device (block 302). In accordance with the principles discussed herein, each of these search queries includes a digital image used as a basis to initiate a search. By way of example, the service provider system 104 receives a plurality of search queries 202 from the computing device 102 over the network 106. These search queries 202 include digital images for use as a basis for visual search. The service provider system 104 leverages the functionality of the search module 206 to perform searches requested by the search queries. Based on the searches, the service provider system 104 returns the search results 204, e.g., to computing devices associated with the respective search query 202.

Unsuccessful queries are identified from the plurality of monitored search queries (block 304). In accordance with the principles described herein, the search queries identified as unsuccessful are not successful in locating a corresponding item of digital content. By way of example, the search query classification module 216 is employed by the service manager module 122 to identify which of the plurality of search queries 202 are not successful in locating a corresponding item of digital content. As noted above, the search query classification module 216 may determine a given search query 202 is not successful based on a variety of factors, including user feedback, without departing from the spirit or scope of the described techniques.

Data is aggregated together that is derived from digital images of the identified search queries that are not successful (block 306). In accordance with the principles discussed herein, the data is aggregated based on object recognition and characteristics of corresponding objects using machine learning. By way of example, the search aggregation module 218 aggregates data derived from the digital images of the search queries that are determined unsuccessful at block 306. In particular, the search aggregation module 218 aggregates the data based on object recognition and characteristics identified by the models 212. Notably, these models 212 through training are capable of identifying common objects and characteristics in the digital images of the identified unsuccessful search queries.

A result of the aggregating is output via a user interface (block 308). By way of example, the search aggregation module 218 outputs the result 220, which is configured for output via a user interface, e.g., of the computing device 102. The result 220 may be a visual report that is configured for display via a display device, an audible report that is configured for audio output via one or more speakers, and so forth. In general, the result 220 describes the aggregated data, such as objects and characteristics identified among the unsuccessful search queries. Additionally or alternately, the search aggregation module 218 configures the result 220 to include representative digital images used to perform the search, data describing the objects and/or characteristics of the objects, and so forth.

The described system thus supports the advantage of describing objects and characteristics (e.g., patterns, textures, and materials) that are searched for, but that result in unsuccessful search queries. This informs other users (e.g., listing users of products and services, manufacturers, service providers, and so forth) about unmet needs of searching users, such as commonly searched for objects or image characteristics for which the searching users are searching, but for which suitable search results are not being returned. Consider now the following discussion of using computer vision for iterative search refining without relative attribute tags.

Iterative Search Refining Without Relative Attribute Tags

In image search applications, client device users often have a mental picture of desired content. Conventional systems that help users convey this mental picture to the system involve human in the loop feedback to iteratively refine image search results. In particular, some of these systems present multiple images to a client device user and ask the client device user to select the image that is most similar to the mental picture of the client device user. These systems then use the selected image to further refine the search results.

To perform this search refinement, conventional systems leverage relative attribute tags. Relative attribute tags are indicative of a relative degree to which an image depicts a particular item. By way of example, a digital image that is focused on a dog, with the dog as the primary salient content of the image may include in metadata a dog tag with a relative score, e.g., <dog=0.94>. In contrast, a digital image that is focused on a house with a portion of a dog in the background may also include a dog tag, but with a lower relative score, e.g., <dog=0.12>. Leveraging relative attribute tags, however, may be computationally expensive to further refine image search results, such as in connection with training and updating machine learning models as well as leveraging a trained machine learning model during operation. This can lead to a perceptible delay between user selection of an image and providing a new set of images, and also of ultimately presenting an image that most closely aligns with the mental picture of the client device user.

To overcome these problems, image search refining without relative attribute tags is leveraged in a digital medium environment. The discussed image search refining system may be implemented locally by a computing device, such as by the computing device 102, or remotely over a network, such as by the service provider system 104 over the network 106. By way of example, the search module 206 may be configured to perform procedures of image search refining without relative attribute tags, in one or more implementations. Accordingly, the search module 206 may represent at least some functionality of the image search refining system. Image search refining without relative attribute tags also leverages machine learning. As such, the image search system may also include functionality of the object recognition module 208 and its components.

In contrast to conventional systems, the discussed image search refining system does not use relative attribute tags for iteratively refining search results. Instead, the image search refining system learns an image embedding trained on binary attribute labels. This image embedding is one example of the model 212. The embedding is trained using digital images having binary attribute labels, and by comparing predictions made using the embedding to the digital images and tags used as a basis for the training.

Generally speaking, binary attribute labels describe content by indicating the presence of objects and themes in a digital image. To this end, the absence of a binary attribute label indicates the absence of a respective object or theme in the digital image. By way of example, an image having a dog—focused on a dog—may include a tag for 'dog' in image metadata. This tag corresponds to a binary attribute label for a dog. In contrast, an image without a dog or having just a relatively small portion of a dog may not include a tag for 'dog' in image metadata.

Thus, in accordance with the described techniques, the digital images used for training the embedding space may either include a label for an item or not—indicating simply a presence or absence of an object or characteristic (e.g., pattern, shape, material, or texture) in the images. By using binary attribute labels to train the embedding space, the image search refining system is able to use the embedding space to identify images based on user selected images in a less computationally expensive manner than techniques that use relative attribute tags. This can lead to shorter delays between the user selection and provision of a new set of images. In this context, consider FIG. 4.

Figure 4:
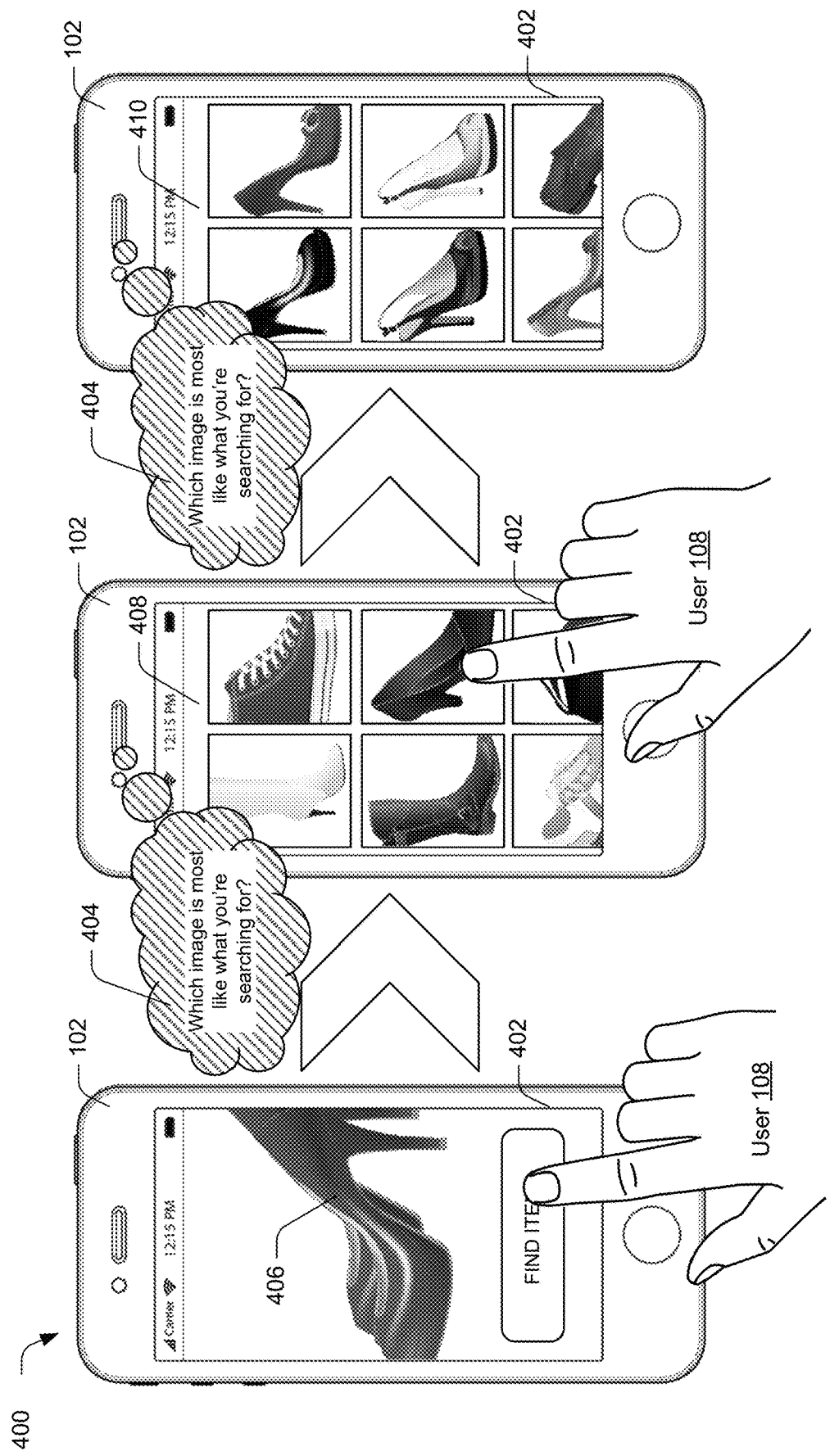
FIG. 4 depicts a scenario in an example implementation in which image search results are refined according to user image selections and using a model trained without relative attribute tags.

FIG. 4 depicts an example scenario 400 in which image search results are iteratively refined based on user selections of images.

In the illustrated scenario 400, the user 108 initially selects or uploads an image via the depicted computing device 102, which is depicted in this example as a mobile device. Based on this initial image, the image refining system (e.g., the search module 206 by leveraging the machine learning module 210) identifies multiple images to present to the user 108 for refining the image search. These images are identified using the embedding space (e.g., the model 212) learned from images with binary attribute labels.

The image refining system then causes the identified images to be presented to the user 108 via a display screen 402 of the computing device 102 along with a prompt 404 that prompts the user to select an image that is most visually similar to a desired image. Based on a selection, the image refining system again determines multiple images and causes the determined images to be presented to the user via the display screen 402 of the computing device 102.

This process continues until the user 108 indicates satisfaction with a presented image (e.g., the image selected for the search in this iteration may correspond to a successful search query) or selects to start the image search over (e.g., the images selected for the search in each of the iterations ending in such a result may correspond to unsuccessful search queries). Information indicative of the user 108's satisfaction or selection to start the image search over may also be leveraged to update the learned embedding space. User interfaces that enable users to select from a plurality of presented images and that prompt users to select from these images may be configured in a variety of different ways than illustrated without departing from the spirit or scope of the techniques described herein.

Figure 5:
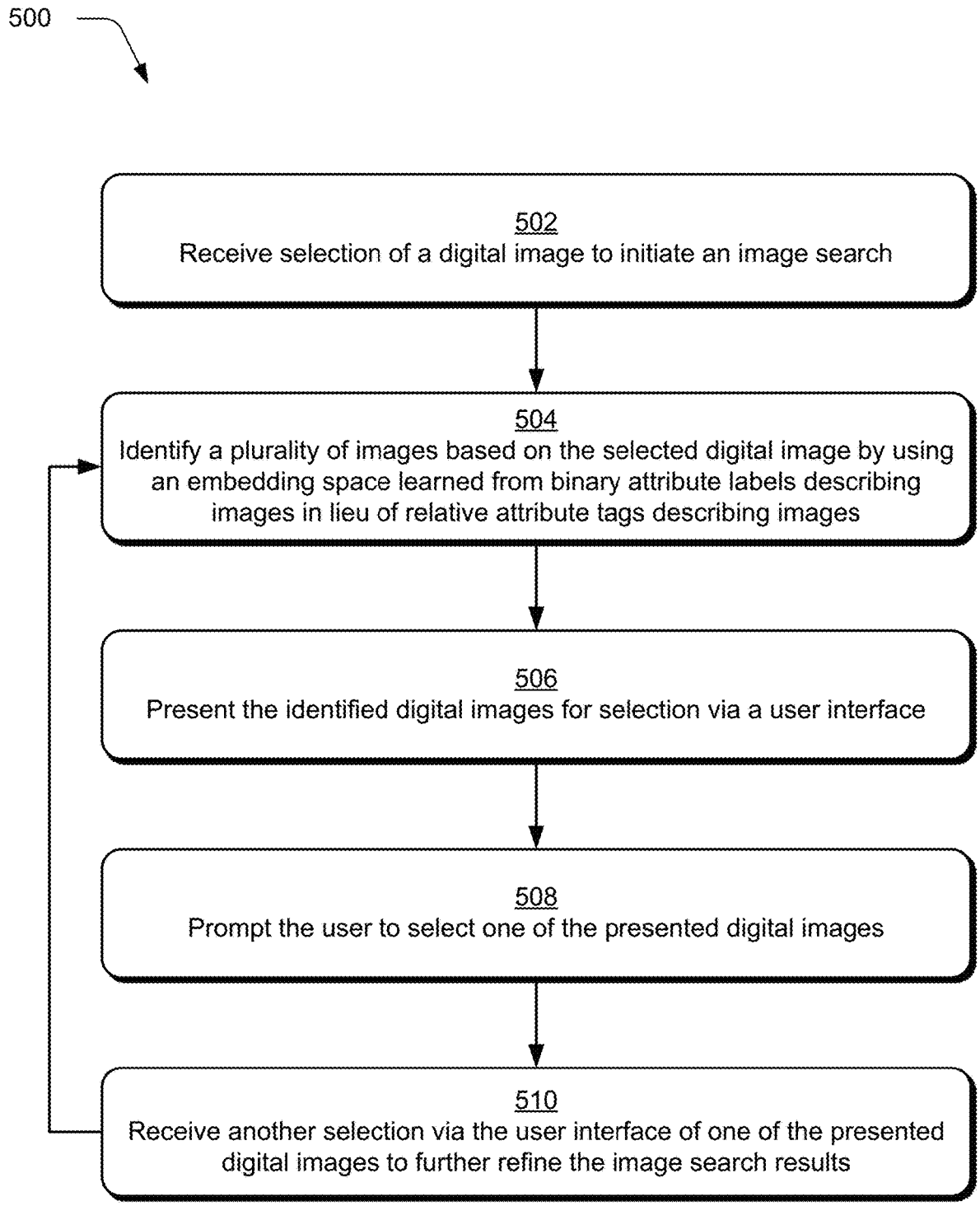
FIG. 5 depicts a procedure in an example implementation in which image search results are iteratively refined based on user selections of images.

FIG. 5 depicts a procedure 500 in an example implementation in which image search results are iteratively refined based on user selections of images.

A selection of a digital image is received to initiate an image search (block 502). By way of example, the computing device 102 receives a selection of digital image 406 to initiate an image search, such as when the user 108 captures the digital image 406 using the digital camera 112, uploads or downloads an image, selects from a predefined group of presented images, and so forth. This image 406 may be packaged as part of an initial search query 202 and received by the service provider system 104 for performing a search by the search module 206, such as a search of a repository of images, a plurality of listings (e.g., of items for sale) having digital content, and so forth.

Image search results returned for the image search are iteratively refined until an indication is received that the image search results are satisfactory or to restart the image search. By way of example, the service provider system 104 returns search results iteratively to the computing device 102 over the network until such an indication is received, e.g., responsive to a selection made via a user interface. The image search results returned are iteratively refined by performing blocks 504-510 in accordance with the following discussion.

A plurality of images is identified based on the selected digital image (block 504). In accordance with the principles described herein, the plurality of images is identified by using an embedding space learned from binary attribute labels describing images in lieu of being learned from relative attribute tags describing the images. By way of example, the search module 206 identifies a plurality of images 408 based on the selected digital image 406. In particular, the search module 206 identifies the plurality of images 408 using the model 212, which in this example comprises an embedding space learned from binary attribute labels describing images and not learned from relative attribute tags describing the images.

The identified digital images are presented for selection via a user interface (block 506). By way of example, the service provider system 104 causes the plurality of images 408 to be displayed by the display screen 402, where causing this display may include packaging the plurality of images 408 in the search results 204 and communicating these search results 204 to the computing device 102 over the network 106.

A user is prompted to select one of the presented digital images (block 508). By way of example, the computing device 102 outputs the prompt 404, prompting a user to select one of the plurality of images 408. The computing device 102 may output this prompt 404 based on instructions to do so that are included in the search results 204 by the service provider system 104.

Another selection is received via the user interface of one of the presented digital images to further refine the image search results (block 510). By way of example, the computing device 102 receives a selection of one of the plurality of images 408 to initiate another image search to further refine the image search results. This other selected image may be packaged as part of an additional search query 202 and received by the service provider system 104 for performing a search using the search module 206. This other selected image is used to refine the image search results, such as through presenting additional plurality of images 410, receiving a selection of one of these additional images 410, and initiating a subsequent search based further on this more recent selection.

In this way, an image search system—included as part of or leveraged by the computing device 102 or the service provider system 104—uses a feedback mechanism to refine the search results without using relative attribute tags that are used by conventional systems. An advantage of this approach is that the image search system learns an image embedding via training on relatively low-cost (e.g., in relation to relative attribute annotations) binary attribute labels already present in many image databases.

As noted above, an initial search query 202 is received as input. At each iteration, the search module 206 searches an image repository using "sampler" strategies to obtain an initial set of candidates. The search module 206 performs "Candidate Refinement" on this set of images using informative, but computationally expensive selection criteria. During the "user feedback" step, a user input is received to indicate if the new refined candidates are more representative of the user's desired image or not. If the user selects to accept a new image, for instance, the selected image becomes the query received by the image search system for the next iteration. Unlike conventional techniques which use costly relative attribute annotations to learn an image representation, the techniques described herein leverage low-cost binary labels that already exist in many datasets.

To learn a robust feature representation, the search module 206 leverages the machine learning module 210, which uses a Conditional Similarity Network (CSN). Thus the model 212 corresponds to a CSN in one or more implementations. In accordance with the described techniques, the machine learning module 210 may include functionality to use a single network to learn an embedding for multiple attributes jointly by learning a masking function which selects features important to each concept. This provides multiple views of the images in an image repository, which is more computationally efficient than training separate embedding models for each concept. By training in this way, the system also factors the overall similarity between two images when training a representation. The resulting model 212 thus encourages samples to separate into homogeneous subgroups in each embedding space. Therefore, the search module 206 can employ the machine learning module 210 to traverse an attribute embedding of the model 212, e.g. heel height, such that a transition from one subgroup to a different sub group (e.g., a boot to a stiletto) in a single step would be unlikely (even if both the boot and stiletto have the same sized heel). By combining constraints with better exploitation of training data, the described system improves over conventional systems in measuring the similarity between two images with regards to a specific concept.

Another difference between the techniques leveraged by the described systems and conventional techniques is that models are trained by the described system with binary attribute labels, which already exist in many datasets and are relatively cheap to obtain. In one or more aspects, the search module 206 refines image search results using a simple feedback mechanism and without using the relative attribute annotations or attribute inputs required by many conventional techniques. In some aspects, the machine learning module 210 trains a Deep-Q Network-based image selection criteria rather than only using hand-crafted strategies. Additionally, the CSN is configured in a way that encourages smooth transitions between different concepts as the machine learning module 210 traverses the learned embedding space.

In the following discussion, aspects of iterative image search include description of sampling strategies such as how to select informative images using a Deep Q-Network.

Modifications are discussed to the CSN which are used during training to learn a set of embeddings used by iterative image search models, such as the model 212.

For image search with iterative, human in the loop feedback, the objective is for the search module 206 to quickly locate a target image $I_t$ in a database given a search query 202, which is represented in the following discussion by the term q. While the initial query can take multiple forms (e.g. keywords, images, or sketches), it is provided as an image $I_{q0}$ which shares some desirable attribute with the target image. At each iteration, the image search system selects K images to obtain feedback on from a user—thus the plurality of images 408 and the additional plurality of images 410 include K images.

Broadly speaking, iterative learning criteria focus on reducing uncertainty in a current model or exploiting the information obtained in order to make fine-grained distinctions. In practice, however, many search engines provide means to filter results based on metadata labels. For example, when searching for clothing, a search engine may allow a user to filter results based on its category (e.g. pants), subcategory (e.g. jeans), and color, among others. Coupled with the initial query, such filters provide a strong signal to initialize an active learning algorithm. Thus, the criteria that follow focus on exploitation of this existing knowledge.

As a baseline, the search module 206 causes an iterative nearest neighbors query to be performed to obtain candidate images. At each iteration, the search module 206 determines the K-nearest neighbors to the current query that have not been previously selected by the user and returns them. Each image selected by the user as the most relevant to their target image is used as the query in the next iteration. In other words, for a given iteration, visual characteristics of the digital images selected during any previous iterations are also used as the query.

The search module 206 employs the machine learning module 210 to use the model 212 to select samples which satisfy a maximum number of feedback constraints provided by the user. For each iteration that a new candidate query $I^*_{qi+1}$ is caused by the user—because rather than indicate the search results are satisfactory the user selects one of the provided images to further refine the search—then $I_{qi}$ is farther away from the target image than $I^*_{qi+1}$. In the following discussion, the term F represents a set of such feedback constraints made so far and the term $\mathcal{O}$ represents a set of previously unselected images in a database. Additionally, elements of F are tuples $(I_x, I_y)$ where $I_x$ is closer to the target image than $I_y$. Based on this, the search module 206 calculates the portion of constraints that a sample satisfies. By way of example, the search module 206 calculates this portion according to the following equation:

$$S(I_o \mid l = 1, F) = \frac{1}{|F|} \sum_{\forall I_{x_n}, I_{y_n} \in F} \mathbb{1}_{fcs}(I_o, I_{x_n}, I_{y_n}),$$

Here, the term $\mathbb{1}_{fcs}$ represents an indicator function that uses a distance function D and returns one if $D(I_o, I_{x_j}) < D(I_o, I_{y_j})$. In accordance with one or more implementations, a scenario where l=1 indicates that a sample satisfies the portion of constraints. Given this, criteria for a next proposed query can be represented in one or more examples as:

$$I^*_{qi+1} = \underset{I_o \in \mathcal{O}}{\mathrm{argmax}} S(I_o \mid l = 1, F).$$

The search module 206 is configured to break ties using nearest neighbors sampling between the candidates and the query image.

While sampling strategies can provide likely candidates based on a current model, these strategies do not take into account an amount a sample informs search results. Many conventional techniques that provide such information are computationally expensive, making it infeasible to run over an entire database. As such, the described search module 206 identifies a short list of likely candidates C using image sampling criteria, and then re-ranks them based on how informative these candidates are to the current model.

In expected error reduction, this refinement strategy leveraged by the search module 206 focuses on reducing generalization error of the current model for the desired target image. As such, the search strategy deployed by search module 206 balances exploration and exploitation criteria. In one or more implementations, the system measures entropy of the current model by calculating the portion of constraints an image satisfies. By way of example, the system may calculate the portion of constraints satisfied in accordance with the following:

$$H(F) = -\sum_{I_o \in \mathcal{O}} \sum_{l} S(I_o \mid l, F) \log(S(I_o \mid l, F)).$$

Here, note that $S(I_o \mid l=0, F)$ is defined as $1-S(I_o \mid l=1, F)$. Further the term $I_{t^*}$ represents a current best guess, which is used as a proxy for the target image when predicting the user's response r. The search module 206 uses the model 212 to estimate a likelihood that a new constraint is satisfied by determining a likelihood that a candidate image shares the same attributes with the target image. The search module 206 obtains this likelihood by converting the distances in an attribute's embedding space within the model 212 to a probability. The search module 206 leverages the machine learning module 210 to learn scaling parameters $\phi$ based on a training set. Given this, the candidate images may be selected according to the following:

$$I^*_{qi+1} = \underset{I_c \in C}{\mathrm{argmax}} \sum_{r} \sigma(r \mid D(I_c, I_{t^*}), \phi) H(F \cup (I_c, r)).$$

Figure 6A:
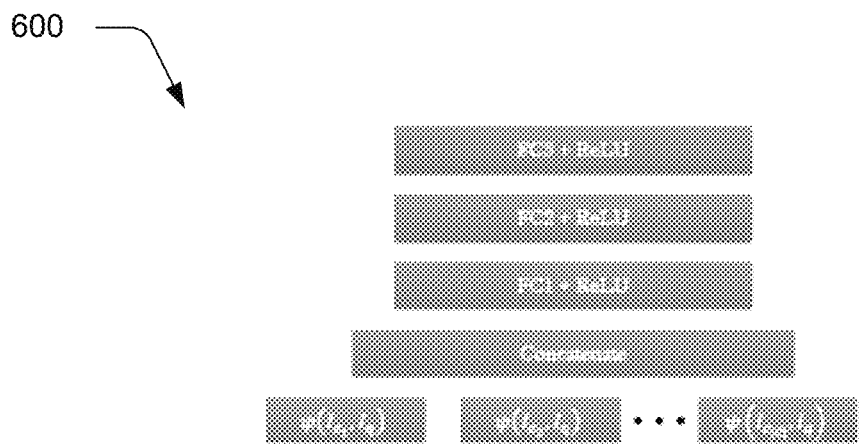
FIGS. 6A-6B depict examples and implementations of image search using a model trained without relative attribute tags.
Figure 6B:
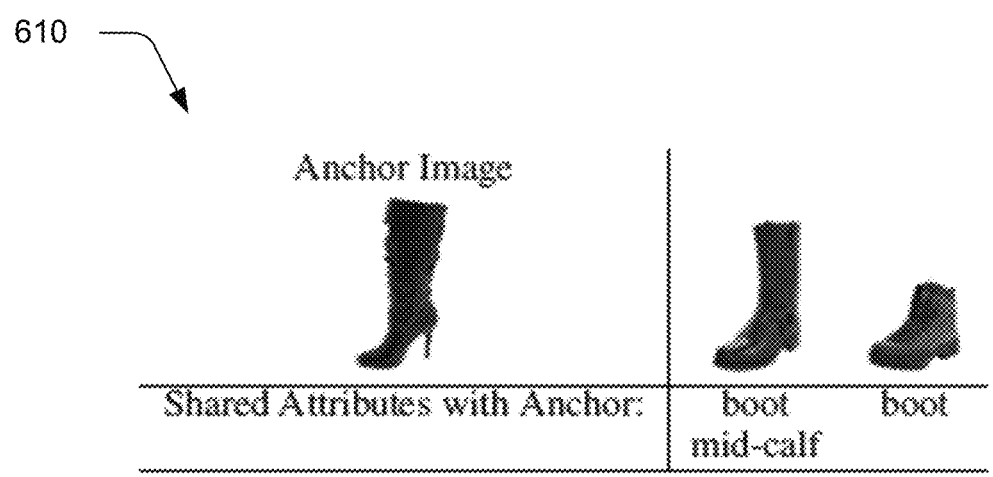

In systems that use Learned Re-ranking Criteria, a learned criteria adapts to the exact task and dataset. To this end, the machine learning module 210 trains a Deep Q-Network (DQN) with experience replay to learn how to select informative images as the candidate images, e.g., the plurality of images 408 or the additional plurality of images 410. In this paradigm, the machine learning module 210 learns a function Q that estimates the reward $\rho$ by taking some action given the current state of the system $\Psi$. In accordance with the described techniques, a value $\rho$ is defined as a change in a percentile rank of the target image under the current model after obtaining feedback from the user. Further, the current state of the system $\Psi$ may be determined as a concatenation of the difference of the embedding representation of the query image and all of the candidate images being re-ranked. FIG. 6A depicts an example 600 of an implementation of a structure of a DQN model. In one or more implementations, the model 212 is implemented based on this structure. In any case, in operation, the search module 206 uses the selection criteria to maximize an expected reward if image $I_c$ is selected to present to the user:

$$I_{q_{i+1}}^* = \underset{I_c \in C}{\operatorname{argmax}} Q(I_c, \Psi).$$

In accordance with the described techniques, this model is trained using Huber loss on top of a temporal difference error between the expected and observed rewards. With reference to the illustrated example 600, the system uses the function $\psi(I_c, I_q)$ to return the difference between each image's feature representation. Further, the output dimension of FC3 is |C|, which represents a predicted reward of selecting its corresponding candidate.

Broadly speaking, the machine learning module 210 trains a set of embeddings to compare two images, where each embedding represents a different attribute to be captured. In implementations where the model 212 is a CSN model, the CSN model is designed to learn a disentangled embedding for different attributes in a single model. In this way, a general image representation is learned through the image encoding layers of the model. A trained mask is then applied to the representation to isolate the features important to that specific attribute. This enables each embedding to share some common parameters across concepts, while the mask is tasked with transforming the features into a discriminative representation. After obtaining the general embedding features between two images $G_i$, $G_j$, the machine learning module 210 compares their general embedding features. By way of example, the machine learning module 210 compares them using a masked distance function, such as:

$$D_m(G_i, G_j; m_a) = \|G_i \star m_a - G_j \star m_a\|_2,$$

Here, the term $m_a$ is a mask for some attribute and the operator ★ denotes an element-wise multiplication. In one or more implementations, the machine learning module 210 trains the CSN model using a triplet loss function such as:

$$L_T(G_x, G_y, G_z; m_a) = \max\{0, D_m(G_x, G_y; m_a) - D_m(G_x, G_y; m_a) + h\}.$$

The machine learning module 210 also configures the embedded features G to be L2 regularized to encourage regularity in the latent space. In addition, L1 regularization is performed on the masks m to encourage a sparse feature selection. Based on this, the resulting total loss function with which the model is trained is:

$$L_{CSN}(G_x, G_y, G_z; m_a) = L_T(G_x, G_y, G_z; m_a) + \lambda_1 \|G\|_2^2 + \lambda_2 \|m_a\|_1$$

Since the goal is to traverse the model's embeddings in order to locate a target image, it is desirable that the embeddings provide natural transitions from image to image. For example, transitioning from an anchor image to the rightmost image in the example 610 of FIG. 6B would be considered a significant divergence. The center image, while still different, is a less divergent transition even though all three images of the example 610 belong to the boot category. Therefore, to make embedding spaces intuitive overall, the machine learning module 210 accounts for similarity between two images beyond an attribute being encoded. Given a set of attributes represented by $A_x$, $A_y$, $A_z$, for each of the images in a training triplet, the difference in shared attributes is computed between the negative and positive pairs. By way of example, the system computes the differences in shared attributes according to the following:

$$w(A_x, A_y, A_z) = \max\left\{0, \frac{1}{\varepsilon}(|A_x \cap A_y| - |A_x \cap A_y|)\right\}$$

Here, the term $\varepsilon$ represents a number of embeddings being trained. The system prevents negative values of w to maintain a minimum margin between negative and positive pairs of the triplet. In one or more implementations, the system determines a new margin, which may be defined as follows:

$$h'(A_x, A_y, A_z) = h + \eta w(A_x, A_y, A_z)$$

Here, the term $\eta$ is the scalar parameter. It is to be appreciated that image searches performed with models trained in manners different from those described just above may be leveraged without departing from the spirit or scope of the described techniques. As noted in the above discussion, iterative image searches that are based on visual characteristics can be effective to convey concepts for search queries in scenarios where it may be difficult for users to accurately convey, in words, a desired target image or item for search.

Having described example techniques and procedures in accordance with one or more implementations, consider now an example system and device that can be utilized to implement the various techniques described herein.

Example System and Device

Figure 7:
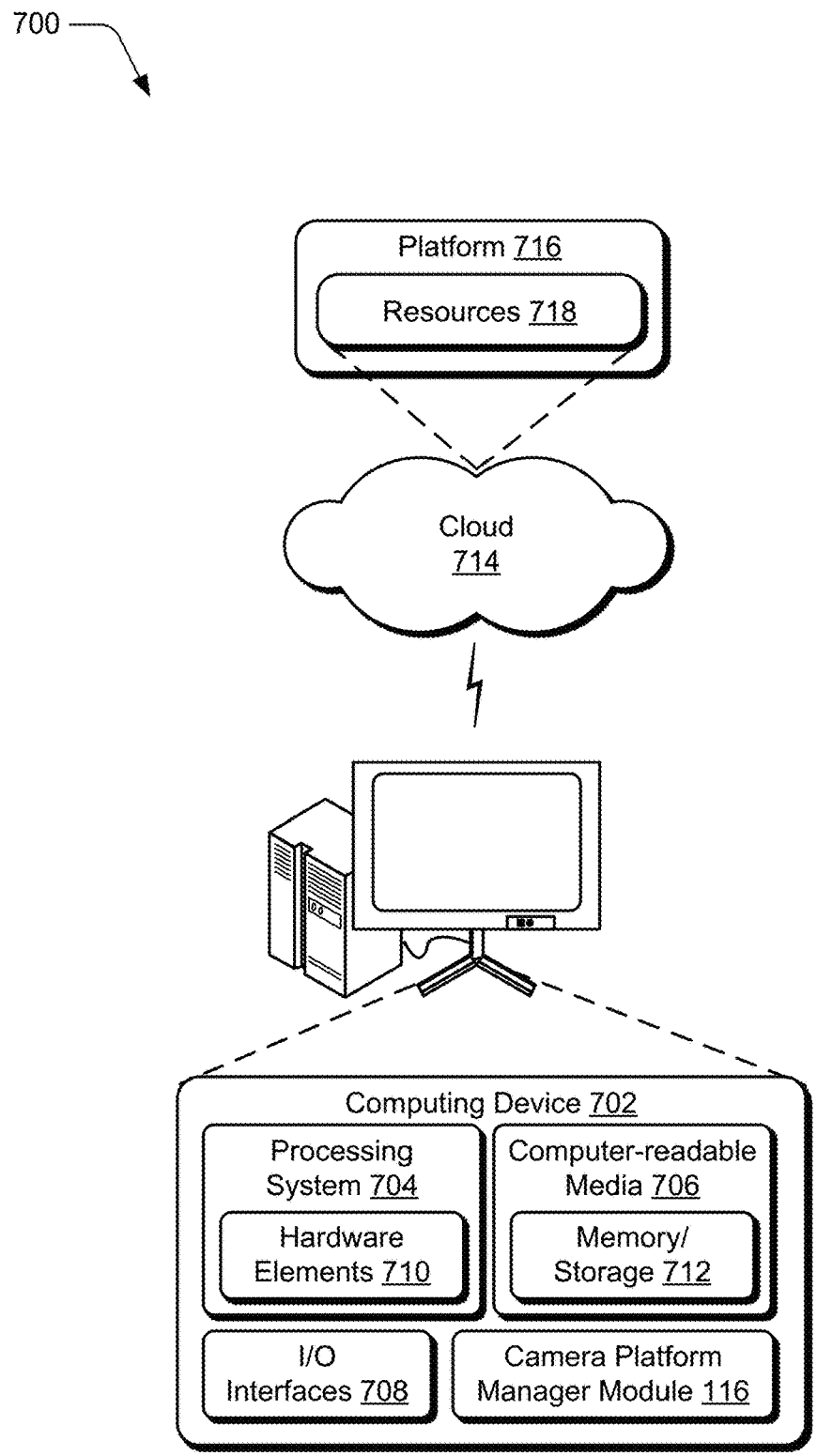
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the camera platform manager module 116. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   monitoring, by the at least one computing device, a plurality of image search queries, each of the plurality of image search queries including a digital image used as a basis to initiate a search;
   identifying, by the at least one computing device, unsuccessful image search queries received from a plurality of users in the plurality of image search queries, the unsuccessful image search queries received from the plurality of users not being successful in locating a respective item of digital content that suitably satisfies the plurality of users and identified based on user input indicating dissatisfaction with returned search results;
   aggregating, by the at least one computing device, data derived from digital images of the unsuccessful image search queries received from the plurality of users together based on common-object recognition across the unsuccessful image search queries' digital images and characteristics of corresponding common objects using machine learning; and
   outputting, by the at least one computing device, a result of the aggregating in a user interface.

2. The method as described in claim 1, wherein the user input does not result in conversion of a product or service.

3. The method as described in claim 1, wherein the user input comprises user feedback in relation to a corresponding search result indicating that the corresponding search result is not satisfactory.

4. The method as described in claim 3, wherein the user feedback corresponds to selection of an image presented as part of the corresponding search result to further refine search results.

5. The method as described in claim 3, wherein the user feedback corresponds to entry of a different image search query.

6. The method as described in claim 1, wherein the result describes recognized objects that are commonly depicted in connection with the unsuccessful image search queries and characteristics of the recognized objects aggregated from the unsuccessful image search queries.

7. The method as described in claim 1, wherein the result comprises representative images of recognized objects that are commonly depicted in connection with the unsuccessful image search queries and aggregated from the unsuccessful image search queries.

8. The method as described in claim 1, wherein the result comprises representative images of visual characteristics aggregated from the unsuccessful image search queries.

9. The method as described in claim 1, wherein the common-object recognition across the unsuccessful image search queries is performed using the machine learning.

10. The method as described in claim 9, wherein the data derived from the digital images comprises feature vectors indicative of content depicted in the digital images.

11. The method as described in claim 1, wherein the common object recognition includes using a neural network to recognize the corresponding common objects.

12. The method as described in claim 11, wherein the neural network is trained using training digital images tagged with identifications of the corresponding common objects.

13. A system comprising:
   a machine learning module implemented at least partially in hardware of at least one computing device to recognize objects and visual characteristics of the objects in digital images using one or more machine learning models;
   a search module implemented at least partially in the hardware of the at least one computing device to receive image search queries including digital images and generate search results having similar digital images to the digital images of the image search queries based on recognized objects and recognized visual characteristics recognized by the one or more machine learning models;
   an unsuccessful image query module implemented at least partially in the hardware of the at least one computing device to identify unsuccessful image search queries received from a plurality of users in the image search queries, the unsuccessful image search queries not being successful in locating a respective item of digital content that suitably satisfies the plurality of users and identified based on user input indicating dissatisfaction with returned search results; and
   a search aggregation module implemented at least partially in the hardware of the at least one computing device to aggregate data that is derived from the unsuccessful image search queries received from the plurality of users based on common-object recognition across the unsuccessful image search queries' digital images by the one or more machine learning models.

14. The system as described in claim 13, wherein the search module is further configured to iteratively refine the returned search results for the unsuccessful image search queries by obtaining user selections of new image search queries from the similar digital images of the returned search results and generating additional search results based on the new image search queries.

15. The system as described in claim 13, wherein:
   the machine learning module is further configured to learn common visual characteristics from the digital images of the unsuccessful image search queries using the one or more machine learning models; and
   the search aggregation module is further configured to generate digital content describing learned common visual characteristics of the digital images of the unsuccessful image search queries, the generated digital content configured for output via a user interface.

16. Non-Transitory computer-readable storage media having stored thereon instructions that are executable by one or more processors to perform operations including:
   monitoring a plurality of image search queries, each of the plurality of image search queries including a digital image used as a basis to initiate a search;

identifying unsuccessful image search queries received from a plurality of users in the plurality of image search queries, the unsuccessful image search queries received from the plurality of users not being successful in locating a respective item of digital content that suitably satisfies the plurality of users and identified based on user input indicating dissatisfaction with returned search results;

aggregating data derived from digital images of the unsuccessful image search queries received from the plurality of users together based on common-object recognition across the unsuccessful image search queries' digital images and characteristics of corresponding common objects using machine learning; and outputting a result of the aggregating in a user interface.

17. The non-transitory computer-readable storage media as described in claim 16, wherein the user input does not result in conversion of a product or service.

18. The non-transitory computer-readable storage media as described in claim 16, wherein the user input comprises user feedback in relation to a corresponding search result indicating that the corresponding search result is not satisfactory.

19. The non-transitory computer-readable storage media as described in claim 18, wherein the user feedback corresponds to selection of an image presented as part of the corresponding search result to further refine search results.

20. The non-transitory computer-readable storage media as described in claim 18, wherein the user feedback corresponds to entry of a different image search query.

* * * * *